Figure 1:
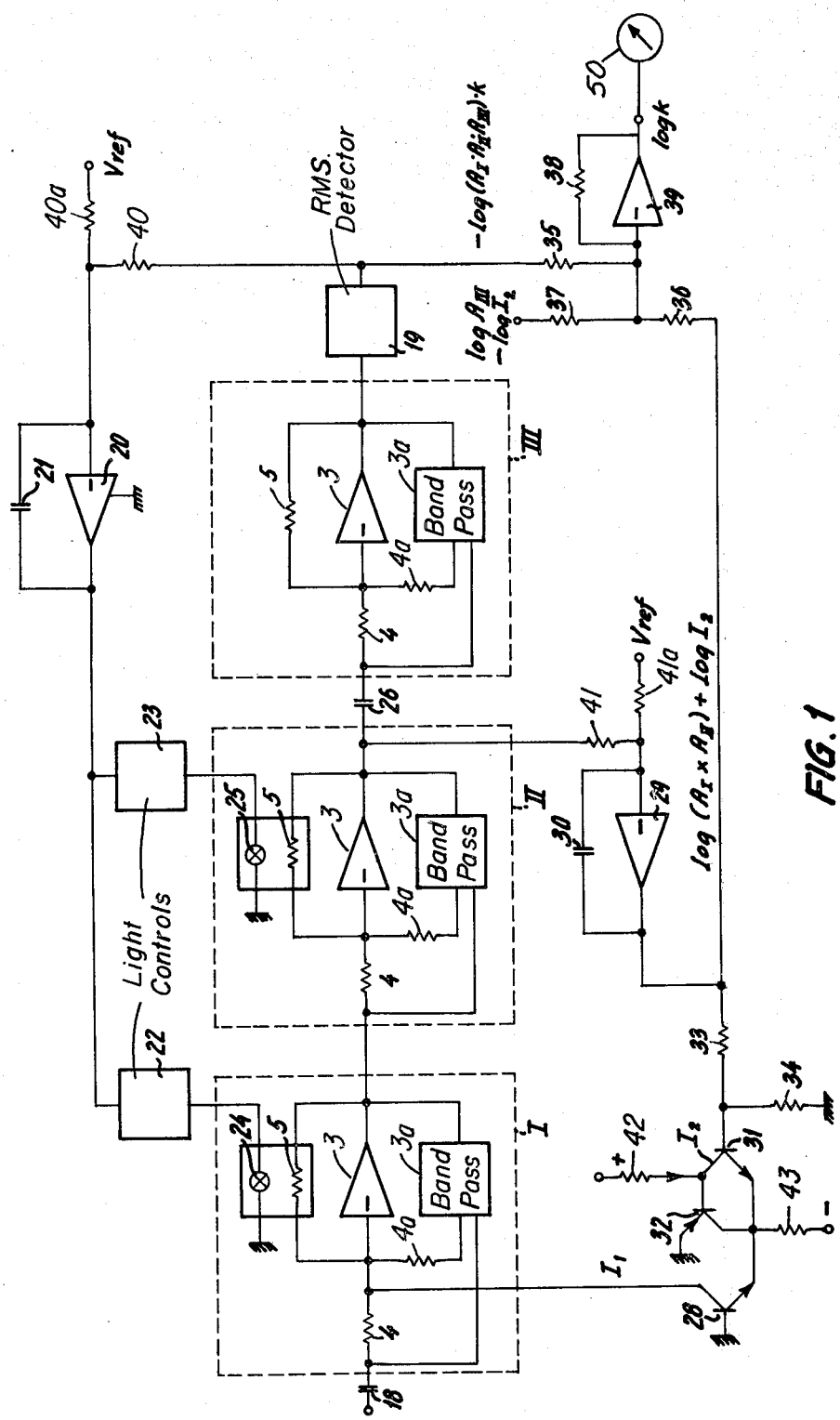

United States Patent [19]
Kristensen et al.

[11] 3,890,570
[45] June 17, 1975

[54] DISTORTION MEASURING DEVICE

[75] Inventors: Erik Edeling Kristensen, Tastrup; Stig Glerup Mikkelsen, Herlev, both of Denmark

[73] Assignee: Radiometer A/S, Copenhagen, Denmark

[22] Filed: May 30, 1973

[21] Appl. No.: 365,281

[30] Foreign Application Priority Data
June 6, 1972 Denmark ........................... 2811/72

[52] U.S. Cl. ................ 324/77 R; 328/162; 328/167
[51] Int. Cl. .............................................. G01r 23/16
[58] Field of Search .......... 324/77 R, 128; 328/162, 328/167

[56] References Cited
UNITED STATES PATENTS

| | | | |
|---|---|---|---|
| 2,561,234 | 7/1951 | Saunders | 328/162 |
| 3,268,815 | 8/1966 | Banach | 328/162 X |
| 3,714,588 | 1/1973 | Deboo et al. | 328/167 |
| 3,787,774 | 1/1974 | Tietze et al. | 328/167 |

*Primary Examiner*—Stanley T. Krawczewicz
*Attorney, Agent, or Firm*—Stevens, Davis, Miller & Mosher

[57] ABSTRACT

A distortion measuring device for automatic distortion measuring is disclosed, having means in the form of tunable active band stop filters with associated control circuits for automatically tuning out the fundamental while transferring the harmonics to a measuring circuit. Further is disclosed a measuring circuit for such a device, in which the measuring of the harmonics is carried out as a measuring of the amplification in active filters provided with amplification control for obtaining constant output level. Such a measuring circuit is described combined with means for measuring the output level from the filters to enlarge the measuring range beyond the limit where the amplification control of the filters fail to maintain the constant value of the output level of the filters.

5 Claims, 2 Drawing Figures

DISTORTION MEASURING DEVICE

The invention relates to a distortion measuring device for measuring the content of distortion components of a signal in relation to a fundamental, in which measuring device the fundamental is suppressed by means of a circuit arrangement tuned to the frequency of the fundamental, and a measuring circuit provides a measure of the relative value of the distortion components.

Prior art distortion measuring devices of the type referred to above comprise a bridge circuit for suppressing the fundamental. As the bridge circuit is to transmit the harmonics of the fundamental, but not the fundamental proper it must be frequency-dependent. Frequently a Wienbridge is employed as bridge circuit. For the adjustment of the balance of the bridge at the frequency of the fundamental, such frequency-dependent bridge circuits require the adjustment of two independent quantities, since both the real and imaginary parts of the bridge impedances have to be balanced.

The adjustment of the imaginary part is usually called frequency tuning, while the adjustment of the real part is called balancing. The adjustment of such bridge circuits is difficult and time-consuming and has required expert attendance.

In order to facilitate the adjustment of the bridge it is known, by means of two independent control loops, to perform a fine adjustment with regard to frequency and balance when an approximate adjustment has been performed manually. The two control loops are controlled by the phase shifts of the fundamental within the bridge circuit and influence each other, so that only very small inaccuracies in the adjustment of the bridge can be balanced and, consequently, it is impossible to achieve an automatization of the distortion measuring.

By means of the present invention a distortion measuring device of the type mentioned above is provided, in which an automatization of the measuring is possible.

According to the invention this is achieved by the circuit arrangement for suppressing the fundamental, comprising one or more series-connected, active band stop filters, each with two or more controllable circuit elements for adjusting the tuning of the filter, the said circuit elements in each filter being all controlled via one control circuit by a phase-sensitive detector, connected across the filter.

When such a circuit arrangement comprising one or more active band stop filters is employed in the distortion measuring device according to the invention, the necessity of balancing a bridge circuit is avoided, and the adjustment of the circuit arrangement can be effected merely by a frequency tuning of the individual band stop filters. This single control circuit for each filter will hereby, unaffected by other factors, be capable of performing the necessary tuning of the band stop filter, and this can be performed within a very wide frequency range. A signal with a fundamental within this frequency range will in the distortion measuring device according to the invention be transmitted by the circuit arrangement and in the latter provide such phase conditions that the control circuit is actuated for adjusting the controllable circuit elements in such a way that the fundamental is attenuated. Hereby, this adjustment of the distortion measuring device dependent on the fundamental of the signal supplied can take place automatically.

According to an embodiment of the invention, each filter preferably consists of an amplifier which is negatively fed back via a band-pass filter containing integrators with controllable resistors for tuning the filter. These controllable resistors may, according to a further embodiment, be light-sensitive resistors which are coupled optically to a light source in the control circuit of the filter, the light of which light source being controlled by the detector connected to the filter.

The signal from the output of the last band stop filter can be supplied to a measuring instrument which preferably indicates the r.m.s. value of the signal and provides a measure for the value of the distortion components. If the signal supplied to the input of the active filters has a predetermined, constant level, it is thus possible to read the relative content of distortion components in the input signal, particularly the distortion factor, directly on the measuring instrument.

In the case that the circuit arrangement comprises several active band stop filters it is necessary to ensure that on the input of the last active band stop filter there is a sufficient level of the fundamental in relation to the distortion components for this latter filter to be tuned to the frequency of the fundamental. With a view to this, the preceding filters in the series-connection are preferably so arranged that the amplification of the distortion components is controllable dependent on the output signal from the last of the active filters in such a way that it tends to keep the level of this output signal constant, while the measuring circuit is arranged for measuring the amplification in the amplification-controlled active filters. By the active filters with their negative feedback via the associated band-pass filter providing a constant attenuation of the fundamental independently of the amplification of the distortion components by the controllable filters, it is thus obtained that the circuit arrangement can handle not only signals having a low level of the distortion components, whereby the amplification of these components by the band stop filters is large, but also signals having a high level of distortion components, whereby the amplification in the filters located before the last filter is reduced as regards the distortion components and at the same time the level of the fundamental is maintained unaltered. Consequently it is avoided that distortion components can override the fundamental and bring the last filter out of tuning, and the distortion measuring device is thus capable of handling signals having very different relative contents of distortion components.

In this embodiment of the distortion measuring device according to the invention there is, for measuring the relative content of distortion components in the input signal, performed a measuring of the amplification in the controllable active filters. In a further embodiment of the invention this can be effected by the amplification-controlled active filters being d.c.-coupled, while the measuring circuit is arranged for supplying a d.c. to the amplification-controlled active filters and for deriving the d.c.-signal amplified in the filters as well as for deriving a quantity from these d.c.-signals as a measure of the amplification of the filters. Preferably, the quantity produced as a measure of the amplification of the filters is according to a further embodiment of the invention logarithmically dependent on the amplification, in addition to which the measuring circuit furthermore comprises means for adding this quantity to a similar quantity corresponding to the logarithm of the output voltage of the filters and for supplying the sum to a measuring instrument.

Figure 2:
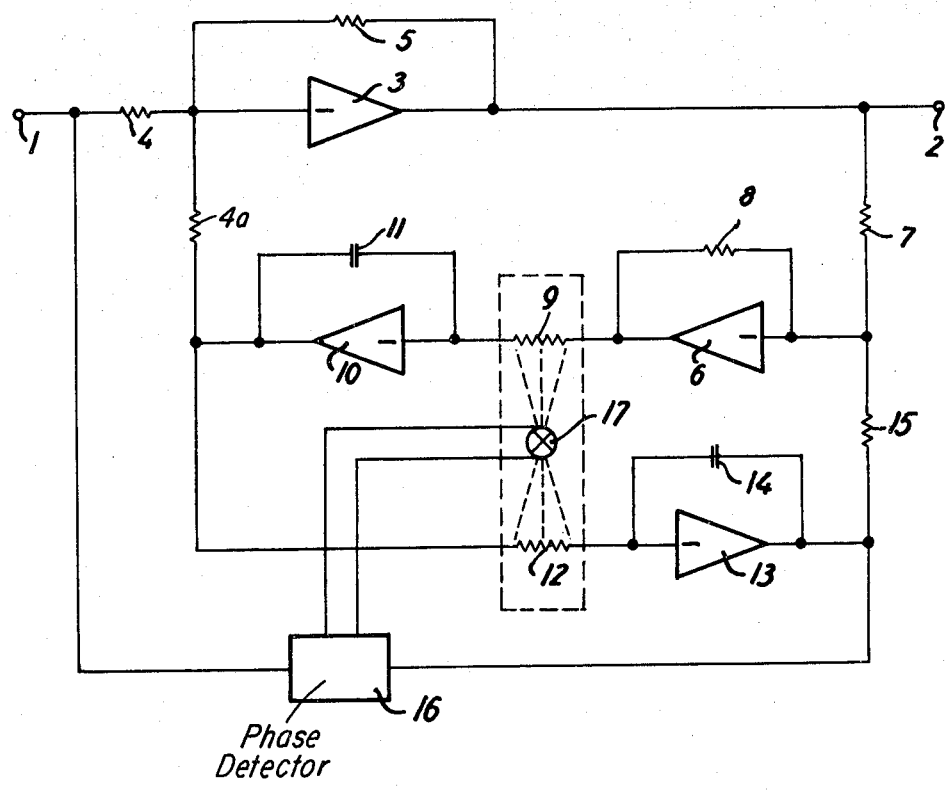

Below, the invention is explained in greater detail with reference to the diagrammatical drawing in which FIG. 1 shows a circuit arrangement formed by three band stop filters and a measuring circuit for a distortion measuring device according to the invention and FIG. 2 shows a band stop filter for use in the circuit arrangement shown in FIG. 1.

The circuit arrangement shown in FIG. 1 comprises three series-connected active band stop filters I, II and III each containing an amplifier 3, with a feed-back loop including a band pass filter 3a in series with a resistor 4a and a further feed-back loop including a resistor 5. An example of one of these band stop filters, viz. the filter III, is shown in greater detail in FIG. 2.

Between its input 1 and its output 2 the band stop filter shown in FIG. 2 comprises the amplifier 3 where the amplification of the filter is determined by resistors 4 and 5 and by the negative feedback loop which form a tunable band-pass filter. This band-pass filter is constructed in a manner known per se by means of integrators and resistors together with an inverting amplifier. The amplifier 6 with resistors 7 and 8 is series-connected to the low-pass filter formed by a resistor 9 and an integrator with amplifier 10 and integration capacitor 11. This series-connection is in turn negatively fed back via a low-pass filter, formed by a resistor 12 and another integrator with amplifier 13 and integration capacitor 14, in series with a resistor 15. The frequency, to which this band-pass filter is tuned, depends at a sufficiently high amplification A in the amplifiers 10 and 13 on the time constants RC for the resistor 9 and the capacitor 11 as well as for the resistor 12 and the capacitor 14. Consequently, the tuning of the band-pass filter can be varied by a variation of the resistors 9 and 12.

Across the band stop filter thus provided, a phase detector with associated control circuit 16 is connected which measures the phase shift a signal applied to the input of the filter undergoes and which dependently hereon provides an output voltage which is supplied to a light source 17 that is coupled optically to the resistors 9 and 12 which are designed as light-sensitive resistors. When thus a signal is applied to the filter, the phase detector will determine the phase shift of the fundamental and cause the light source 17 to change the resistance values R of the resistors 9 and 12 in such a way that the filter is tuned to the frequency of the fundamental.

The band stop filters I and II are constructed correspondingly, apart from the fact that the resistor 5 is a light-sensitive resistor controlled in the way further detailed below.

In the circuit arrangement shown in FIG. 1, the three band stop filters I, II and III are so arranged that they automatically adjust themselves to suppress the fundamental which is supplied to the filters via a capacitor 18 from a pre-stage, known per se, which maintains the signal supplied to the filter I at a predetermined level. This pre-stage is, for the sake of clarity, omitted from the drawing.

In each of the three band stop filters I, II and III, the components $k$ of the input signal, the frequency of which is different from the frequency of the fundamental, are amplified. This amplification $A_I$, $A_{II}$ and $A_{III}$, respectively, is determined by the ratio between the resistance values for the resistors 5 and 4 in the individual filters. The amplified distortion components are supplied to an r.m.s. detector unit 19, the output signal of which expresses the r.m.s. value of the amplified distortion components.

In order to avoid that one of the distortion components, by having a high level in the input signal, overrides the fundamental and thereby cause the filter II or III to be erroneously tuned to its frequency, the circuit arrangement shown in FIG. 1 is so arranged that it tends to maintain the output voltage from the unit 19 and, consequently, also the input voltage of the latter at a constant level by means of a negative feedback loop with an integrator consisting of an amplifier 20 and a capacitor 21 which integrator is supplied with the output voltage of detector 19 via a resistor 40 and a reference voltage Vref via a resistor 40a, and the output of which is connected to two control circuits 22 and 23 converting the output voltage of integrator 20, 21 into currents driving two light sources, 24 and 25, respectively, which are coupled optically to the light-sensitive resistors 5 in the two first band stop filters. As long as the distortion components, which are supplied to the input of the band stop filters, exceed a certain value, the output signal from the unit 19 will have a constant value, the amplifications $A_I$ and $A_{II}$ of the distortion components in the two first band stop filters being varied inversely proportional to the r.m.s. values of the distortion components. As the active band stop filters I and II due to the negative feedback via the tuned band-pass filters cause an attenuation of the fundamental, which is independent of the amplification of the distortion components, the level of these components can hereby be kept below the level of the fundamental, so that the filters are with certainty tuned to the frequency of the fundamental. Hereby, the circuit arrangement is capable of handling signals, the relative contents of distortion components of which may assume widely differing values. The content of distortion components in the input signal are then determined in connection with a measuring of the amplification.

In order that the amplification can be measured in the two first band stop filters, the latter are d.c.-coupled, but separated from the remaining part of the circuit arrangement by means of the capacitor 18 and a capacitor 26. A d.c.-signal $I_1$ is supplied to the input of these band stop filters by means of a transistor 28, the base electrode of which is grounded. This d.c.-signal is controlled by feedback by means of an integrator with amplifier 29 and capacitor 30 in such a way that the d.c.-voltage on the output of the second band stop filter II which is supplied to the integrator 29, 30 via a resistor 41 together with the reference voltage Vref via a resistor 41a is maintained constant. Consequently, the current through the transistor 28 will be inversely proportional to the amplification in the two band stop filters and therefore proportional to the distortion components on the input of the circuit arrangement.

The control of the transistor 28 from the integrator 29, 30 is effected via two transistors 31 and 32 which are supplied via a resistor 42 with constant current $I_2$ to the collector electrode of the transistor 31 and together with the transistor 28 form a differential amplifier having a common emitter resistor 43. With this differential amplifier a comparison between the collector current $I_1$ in the transistor 28 and the collector current $I_2$, which is kept constant, in the transistor 31 is obtained, the voltage on the base electrode of the transistor 31 in relation to ground being equal to the base-emittor voltage in the transistor 31 minus the base-emitter voltage in the transistor 28. Since the base-emitter voltage in a transistor is proportional to the logarithm of the collector current, the voltage on the base electrode of the transistor 31 in relation to ground will be proportional to $\log I_2 - \log I_1$, where $\log I_2$ is constant. To the last part, $\log I_1$, applies, as mentioned above, that the collector current in the transistor 28 is inversely proportional to the amplification $A_1 \cdot A_2$, so that $-\log I_1$ is proportional to the logarithm of the said amplification. By means of a voltage divider consisting of resistors 33 and 34 the voltage on the base electrode of the transistor 31 is multiplied so that the output voltage from the integrator 29, 30 will be equal to the logarithm of the amplification in the two first band stop filters plus the constant $\log I_2$.

The voltage supplied to the unit 19 will be equal to the distortion components $k$ multiplied by the amplification in the three band stop filters. If this unit is arranged to deliver an output signal which is equal to minus the logarithm of this quantity, it is possible by adding this signal to the output voltage from the integrator 29, 30 and to a constant voltage equal to $\log A_{III} - \log I_2$ by means of identical resistors 35, 36, 37 and 38 in connection with an amplifier 39, which constitutes an inverter and is negatively fed back via the resistor 38, on the output of the amplifier to achieve a voltage which is equal to the logarithm of the distortion components $k$ on the input to the band stop filters, not only when these are sufficiently powerful for the negative feedback via the integrator 20, 21 to be able to maintain a constant level of the signal to the unit 19 — whereby the distortion measuring occurs by a measuring of the amplification in the two first band stop filters — but also when the distortion components are so weak that the amplification of the band stop filters is controlled to maximum and the voltage to the unit 19 is reduced — whereby the distortion measuring occurs by a measuring of the output voltage from the unit 19 — the two measuring mthods being united by the addition of the logarithmic measuring values. Consequently, the unit 19 need not posses a wide dynamic range — that is to say the ratio between the most powerful and the weakest signal which the unit can handle correctly.

When the pre-stage of the distortion measuring device supplies a constant signal of e.g. 1 volt of the fundamental with the distortion components to the band stop filters, the output voltage from the amplifier 39 will directly indicate the relative distortion or the distortion factor expressed logarithmically on an indicator 50. The distortion measuring device operates automatically within a wide frequency range and within a wide range of distortion factors, since the automatic frequency adjustment by means of one single control loop in each band stop filter makes possible an adjustment covering a wide frequency range, e.g. within the frequency range from 20 Hz to 20 kHz and since the combined measuring method makes possible a distortion measuring with distortion factors between e.g. 0.3 per thousand and 10 per cent without any risk that the filters tune themselves to the frequency of one of the distortion components and without any switching of the measuring circuit or overloading of the latter.

What is claimed is:

1. A distortion measuring device for measuring the content of distortion components of an audio frequency signal in relation to a fundamental, comprising
   a plurality of series-connected active band stop filters tunable to the frequency of the fundamental, each of said band stop filters comprising an amplifier having a negative feed-back circuit including a band-pass filter, said band-pass filter comprising integrators and controllable resistors for tuning said band-pass filter,
   a phase-sensitive detector having inputs connected to receive said audio frequency signal and a signal representative of said fundamental, respectively, and
   control circuit means having an input connected to the output of said phase-sensitive detector for controlling said controllable resistors in said band-pass filter so as to tune said filter to the frequency of the fundamental,
   a measuring circuit connected to the filters to derive therefrom signals representing the relative value of the distortion components, and
   means for transferring said signal to an indicator device.

2. A distortion measuring device as claimed in claim 1 which further comprises means coupled between the output of the last of said series-connected band stop filters and at least one of said plurality of band stop filters for controlling the amplification of said at least one active band stop filter in dependence on the output signal of said last of the series-connected active filters to maintain constant the level of said output signal, and wherein said measuring circuit measures the amplification in the amplification-controlled active band stop filters, said measurement being coupled to the indicating device means.

3. A distortion measuring device as claimed in claim 2 wherein the amplification-controlled active band stop filters are d.c.-coupled and which further comprises means in the measuring circuit for supplying a d.c.-signal to the amplification-controlled active filters for deriving the d.c.-signal amplified in the filters and for deriving from these d.c.-signals a first quantity which is a measure of the amplification of the filters.

4. A distortion measuring device as claimed in claim 3, further comprising means in said measuring circuit for producing said first quantity in such a manner as to be logarithmically dependent on the amplification, means in the measuring circuit for producing a second quantity corresponding to the logarithm of the output voltage of the filters and means for adding the first quantity to the second quantity and for applying the sum thereof to the indicator device means.

5. A distortion measuring device as claimed in claim 1 wherein the negative feed-back circuit of at least one of said band stop filters comprises a light sensitive resistor, said distortion measuring device further comprising light emitting means coupled between the output of the last of said series-connected band stop filters and said light sensitive resistor for controlling the amplification of said at least one band stop filter.

* * * * *